United States Patent
Karplus et al.

(10) Patent No.: US 10,291,319 B1
(45) Date of Patent: May 14, 2019

(54) DEVICES AND METHODS FOR OPTICAL COMMUNICATION IN A ROTARY PLATFORM

(71) Applicant: Waymo LLC, Mountain View, CA (US)

(72) Inventors: Paul Karplus, Redwood City, CA (US); Jeffrey Rogers, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 297 days.

(21) Appl. No.: 15/283,328

(22) Filed: Oct. 1, 2016

(51) Int. Cl.
| | | |
|---|---|---|
| *H04B 10/00* | (2013.01) | |
| *H04B 10/116* | (2013.01) | |
| *B60Q 1/50* | (2006.01) | |

(52) U.S. Cl.
CPC ............. *H04B 10/116* (2013.01); *B60Q 1/50* (2013.01)

(58) Field of Classification Search
CPC . H04B 10/112; H04B 10/114; H04B 10/1121; H04B 10/1123; H04B 10/1125; H04B 10/1141; H04B 10/1143; H04B 10/1149; G02B 6/3604; G02B 6/262; G02B 6/4202
USPC ....... 398/118, 119, 120, 122, 127, 128, 129, 398/130, 131, 135, 136, 164, 141, 33, 398/183, 158, 159; 385/25, 26
See application file for complete search history.

(56) References Cited

U.S. PATENT DOCUMENTS

| | | | |
|---|---|---|---|
| 5,553,176 A | 9/1996 | DeMarco | |
| 6,937,787 B2* | 8/2005 | Schilling | A61B 6/56 385/26 |
| 8,315,526 B2* | 11/2012 | Tan | H04B 10/803 398/118 |
| 2011/0026938 A1* | 2/2011 | Lo | G02B 7/24 398/202 |
| 2011/0255070 A1 | 10/2011 | Phillips et al. | |
| 2012/0237198 A1* | 9/2012 | Bowman | G02B 6/3604 398/1 |
| 2014/0160559 A1 | 6/2014 | Mermelstein et al. | |

FOREIGN PATENT DOCUMENTS

JP      2011158926 A      8/2011

* cited by examiner

*Primary Examiner* — Hanh Phan
(74) *Attorney, Agent, or Firm* — McDonnell Boehnen Hulbert & Berghoff LLP (57) ABSTRACT

In one example, a device includes a first platform having a first side and a second platform having a second side that overlaps the first side. The device also includes an actuator that rotates the first platform relative to the second platform. The device also includes a plurality of light sources mounted to the first platform in a substantially circular arrangement around the axis of rotation of the first platform. The plurality of light sources emit a plurality of light beams such that respective adjacent light beams intersect at least at a predetermined distance to the first side. The first side remains at least at the predetermined distance to the second side in response to the actuator rotating the first platform. The device also includes a light detector mounted to the second platform and positioned to at least partially overlap at least one of the plurality of light beams.

19 Claims, 6 Drawing Sheets

DEVICES AND METHODS FOR OPTICAL COMMUNICATION IN A ROTARY PLATFORM

BACKGROUND

Unless otherwise indicated herein, the materials described in this section are not prior art to the claims in this application and are not admitted to be prior art by inclusion in this section.

Rotary joint devices are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, robotic components, etc.), among others.

SUMMARY

In one example, a device comprises a first platform that includes a first mounting surface. The device also comprises a second platform that includes a second mounting surface positioned within a predetermined distance to the first mounting surface. The device also comprises an actuator that rotates the first platform relative to the second platform about an axis of rotation of the first platform. The first mounting surface remains within a predetermined distance to the second mounting surface in response to the actuator rotating the first platform. The device also comprises a plurality of light sources mounted on the first mounting surface in a circular arrangement around the axis of rotation. The plurality of light sources emit a plurality of light beams that diverge to form a ring-shaped light beam incident on the second mounting surface. The device also comprises a light detector mounted on the second mounting surface such that the light detector remains at least partially overlapping the ring-shaped light beam in response to the actuator rotating the first platform.

In another example, a device includes a first platform having a first side and a second platform having a second side positioned to overlap the first side of the first platform. The device also includes an actuator that rotates the first platform relative to the second platform and about an axis of rotation of the first platform. The device also includes a plurality of light sources mounted to the first platform in a substantially circular arrangement around the axis of rotation of the first platform. The plurality of light sources emit a plurality of diverging light beams such that respective adjacent light beams intersect at least at a predetermined distance to the first side. The first side remains at least at the predetermined distance to the second side in response to the actuator rotating the first platform. The device also includes a light detector mounted to the second platform and positioned to at least partially overlap at least one of the plurality of light beams.

In yet another example, a device includes a first platform and a second platform positioned to overlap the first platform. The device also includes an actuator that rotates the first platform relative to the second platform and about an axis of rotation of the first platform. The first platform remains at a predetermined distance to the second platform in response to the actuator rotating the first platform. The device also includes at least one light source mounted to the first platform. The at least one light source provides a ring-shaped light beam incident on the second platform. The device also includes a light detector mounted to the second platform and positioned to remain at least partially overlapping the ring-shaped light beam in response to the actuator rotating the first platform.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed implementations with reference to the accompanying figures. In the figures, similar symbols identify similar components, unless context dictates otherwise. The illustrative implementations described herein are not meant to be limiting. It may be readily understood by those skilled in the art that certain aspects of the disclosed implementations can be arranged and combined in a wide variety of different configurations.

I. Overview

An example rotary joint device includes two platforms arranged such that a first side of a first platform remains within a predetermined distance to a second side of a second platform in response to a relative rotation between the two platforms. For instance, the two platforms may include circularly shaped disks arranged concentrically about a common axis of the respective disks to maintain an overlap between the two respective sides separated by the predetermined distance in response to rotation of any of the two platforms about the common axis. Other configurations are possible as well.

In some implementations, the first platform may include a plurality of light sources in a substantially circular arrangement around an axis of rotation of the first platform. For example, the light sources could be implemented as light emitting diodes (LEDs) mounted on a printed circuit board (PCB) that is included in the first platform. The plurality of light sources may emit a plurality of light beams toward the second platform. For instance, the light beams may diverge and intersect to form a ring-shaped light beam incident on the second platform. Further, in these implementations, the second platform may include a light detector that remains at least partially overlapping the ring-shaped light beam in response to a rotation of the first platform relative to the second platform.

With this arrangement, for instance, the rotary joint device can provide an optical communication path for transmitting signals from the first platform to the second platform. By way of example, the device may include a first controller that provides a modulated electrical signal for modulating the plurality of light beams emitted by the plurality of light sources of the first platform. For instance, the modulated electrical signal may indicate sensor data collected by a sensor mounted in the first platform. Further, the device may include a second controller coupled to the light detector of the second platform. The second controller could thus receive an indication of modulated light detected by the light detector, and use the received indication as a basis for determining the sensor data transmitted via the first controller.

In some configurations, a signal-to-noise ratio of the modulated signal detected by the light detector may be affected by the rotation of the first platform. For instance, an intensity of light beam(s) incident on the light detector could vary due to fluctuations in the distance between the two platforms caused by the rotation and/or characteristics of the light sources (e.g., beam divergence characteristics, separation distance between adjacent light sources, etc.), among other factors. As a result, an output of the light detector may similarly vary.

To improve the signal-to-noise ratio, in some implementations, the second platform may also include a second light detector that also remains at least partially overlapping the light beam(s) incident on the second platform in response to the rotation of the first platform. For instance, the two light detectors can be arranged along a circular path that is concentric with the circular arrangement of the light sources (e.g., around the axis of rotation). In this instance, both light detectors could (at least partially) remain along a propagation path of one or more of the light beams emitted by the light sources of the first platform as the first platform rotates. Further, in some examples, the two light detectors can be arranged according to an expected variation in the light intensity of the incident light beams. By way of example, a first separation distance between the two light detectors can be selected to be less than a second separation distance between adjacent light sources of the first platform.

With this arrangement, for instance, when the first light detector is aligned with a first light source (e.g., maximum signal-to-noise ratio), the second light detector may become aligned between the first light source and a second light source. As the first platform rotates, the two light detectors may become less aligned (i.e., reduced signal-to-noise ratio) with the first light source, but one or both of the two light detectors may simultaneously become more aligned with the second light source. Thus, the combined outputs of the two light detectors may experience less rotation-dependent fluctuations (i.e., improved signal-to-noise ratio) as compared to an output of only one of the two light detectors. Accordingly, in some implementations, the device or a component thereof (e.g., second controller) could determine an indication of modulated light incident on the second platform based on a sum of the outputs of the two light detectors (e.g., a sum of electrical currents associated with the two light detectors). For instance, the sum of the electrical currents can be computed by a controller coupled to both light detectors or can be provided by coupling the two light detectors in a parallel circuit configuration, among other possibilities. Thus, with this arrangement for instance, the rotary joint device can improve reliability and/or communication bandwidth between the two platforms.

In some implementations, the second platform may also include a plurality of light sources and one or more light detectors that are similar, respectively, to the light sources and detector(s) of the first platform. Thus, for instance, the rotary joint device may support two-way communication between the first platform and the second platform.

Additionally, in some implementations, modulated light emitted by the respective light sources of the two platforms can be modulated based on a controller access network (CAN) bus protocol. For example, the first controller of the first platform can cause the light sources of the first platform to emit one or more light pulses indicating an assertion of a dominant (high priority) state for transmitting data toward the second platform. Upon detecting the assertion message, the second controller of the second platform can stop or delay transmitting data using the light sources of the second platform until the first platform completes transmission of the higher priority data. Similarly, for example, the second controller can assert the dominant state for transmitting data toward the first platform.

Further, in some examples, the rotary joint device could facilitate optical CAN bus communication between multiple CAN nodes (e.g., sensors, computing systems, subsystems, etc.) distributed between the first platform and the second platform. For example, the first controller can assign different priorities to data originating from one or more sensors mounted in the first platform. Further, for example, the second controller can assign different priorities for data originating from one or more systems or subsystems (e.g., navigation system, user interface system, etc.) coupled to the second controller. In these examples, one or both of the two controllers can then buffer, schedule, prioritize, and/or otherwise allocate time blocks for transmitting various blocks of data between the two platforms according to respective determined or assigned priorities associated with the communicated data.

Other example arrangements, configurations, and operations are possible as well and are described in greater detail within exemplary implementations herein.

II. Example Electromechanical Systems and Devices

Systems and devices in which example embodiments may be implemented will now be described in greater detail. In general, the embodiments disclosed herein can be used with any electromechanical system that includes a moveable component. An example system can provide for transmission of power and/or signals between the moveable component and other parts of the system. Illustrative embodiments described herein include vehicles that have moveable components such as sensors and wheels that communicate with other components of the vehicle and/or with one another. However, an example electromechanical system may also be implemented in or take the form of other devices, such as sensing platforms (e.g., RADAR platforms, LIDAR platforms, directional sensing platforms, etc.), robotic devices, industrial systems (e.g., assembly lines, etc.), medical devices (e.g., medical imaging devices, etc.), or mobile communication systems, among others.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, a farm vehicle, or a carrier that rides on a track (e.g., roller coaster, trolley, tram, train car, etc.), among other examples.

Figure 1:
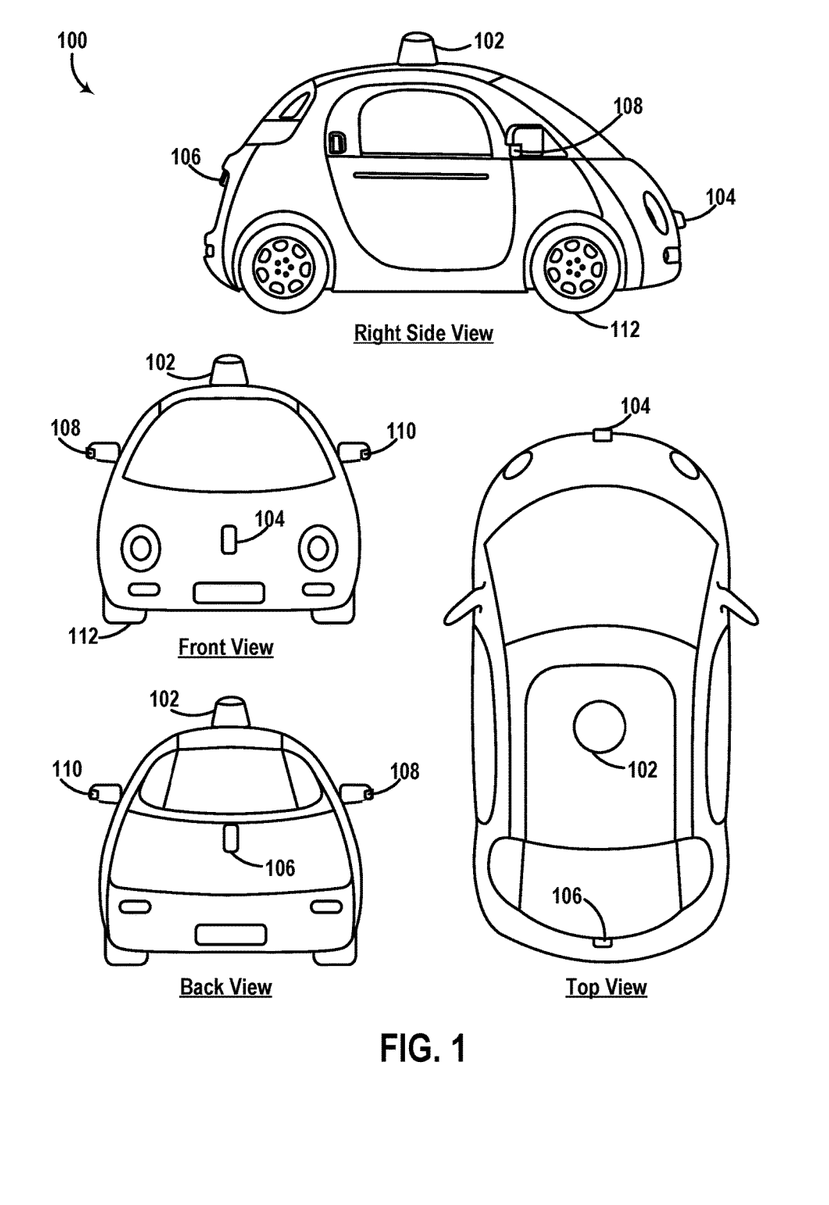
FIG. 1 illustrates a vehicle, according to an example embodiment.

FIG. 1 illustrates a vehicle 100, according to an example embodiment. In particular, FIG. 1 shows a Right Side View, Front View, Back View, and Top View of the vehicle 100. Although vehicle 100 is illustrated in FIG. 1 as a car, as noted above, other types of vehicles are possible as well. Furthermore, although vehicle 100 can be configured to operate autonomously, the embodiments described herein are also applicable to vehicles that are not configured to operate autonomously or that are configured to operate semi-autonomously. Thus, vehicle 100 is not meant to be limiting. As shown, vehicle 100 includes five sensor units 102, 104, 106, 108, and 110, and four wheels, exemplified by wheel 112.

In some embodiments, sensor units 102-110 may include any combination of sensors, such as global positioning system sensors, inertial measurement units, radio detection and ranging (RADAR) units, cameras, laser rangefinders, light detection and ranging (LIDAR) units, or acoustic sensors, among other possibilities.

As shown, sensor unit 102 is mounted to a top side of the vehicle 100 opposite to a bottom side of the vehicle 100 where the wheel 112 is mounted. Further, sensor units 104-110 are respectively mounted to respective sides of vehicle 100 other than the top side. As shown, sensor unit 104 is positioned at a front side of vehicle 100, sensor 106 is positioned at a back side of vehicle 100, the sensor unit 108 is positioned at a right side of vehicle 100, and sensor unit 110 is positioned at a left side of vehicle 100.

Although sensor units 102-110 are shown to be mounted in particular locations on vehicle 100, in some embodiments, sensor units 102-110 can be mounted in other locations, either inside or outside vehicle 100. For example, although sensor unit 108 as shown is mounted to a rear-view mirror of vehicle 100, sensor unit 108 may alternatively be positioned in another location along the right side of vehicle 100. Further, while five sensor units are shown, in some embodiments more or fewer sensor units may be included in vehicle 100. However, for the sake of example, sensor units 102-110 are positioned as shown.

In some embodiments, one or more of sensor units 102-110 may include one or more movable mounts on which the sensors can be movably mounted. A movable mount may include, for example, a rotating platform. Alternatively or additionally, a movable mount may include a tilting platform. Sensors mounted on a tilting platform could be tilted within a given range of angles and/or azimuths, for example. A movable mount may take other forms as well.

In some embodiments, one or more of sensor units 102-110 may include one or more actuators configured to adjust a position and/or orientation of sensors in the sensor unit by moving the sensors and/or movable mounts. Example actuators include motors, pneumatic actuators, hydraulic pistons, relays, solenoids, and piezoelectric actuators, among others.

As shown, vehicle 100 includes one or more wheels such as wheel 112 that are configured to rotate to cause the vehicle to travel along a driving surface. In some embodiments, wheel 112 may include at least one tire coupled to a rim of wheel 112. To this end, wheel 112 may include any combination of metal and rubber, or a combination of other materials. Vehicle 100 may include one or more other components in addition to or instead of those shown.

Figure 2:
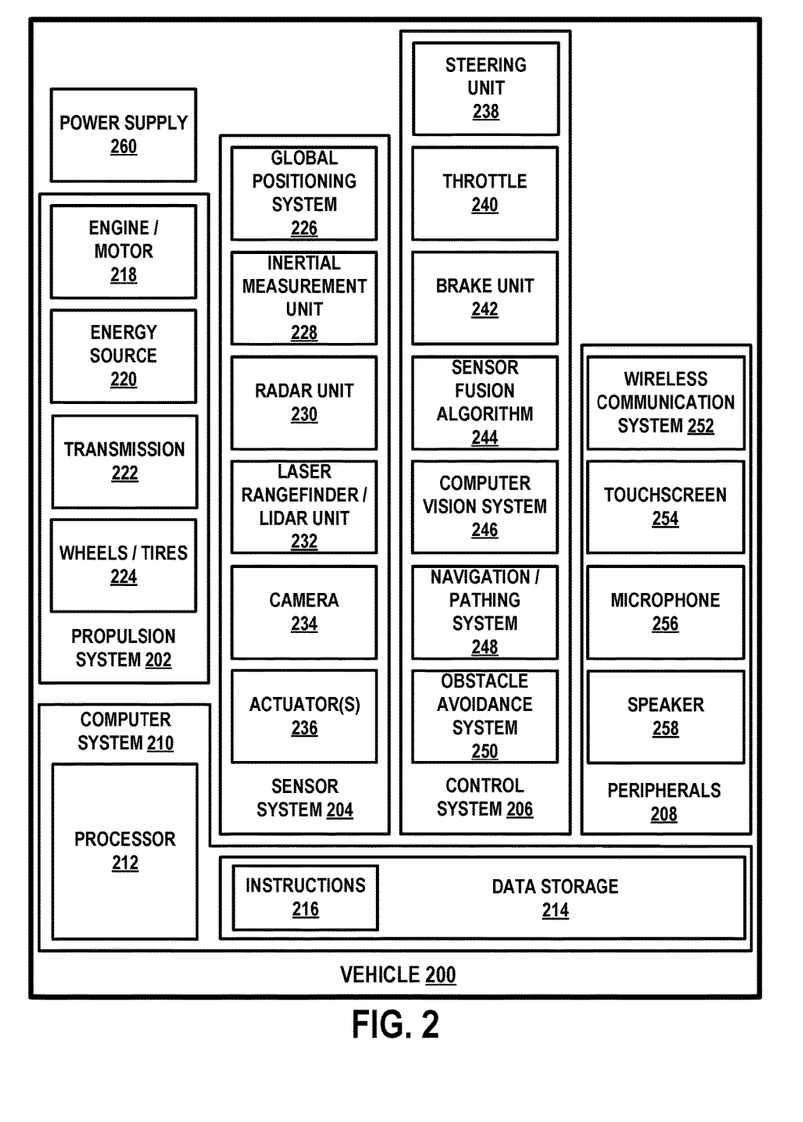
FIG. 2 is a simplified block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

Propulsion system 202 may be configured to provide powered motion for the vehicle 200. As shown, propulsion system 202 includes an engine/motor 218, an energy source 220, a transmission 222, and wheels/tires 224.

Engine/motor 218 may be or include any combination of an internal combustion engine, an electric motor, a steam engine, and a Stirling engine. Other motors and engines are possible as well. In some embodiments, propulsion system 202 may include multiple types of engines and/or motors. For instance, a gas-electric hybrid car may include a gasoline engine and an electric motor. Other examples are possible.

Energy source 220 may be a source of energy that powers the engine/motor 218 in full or in part. That is, engine/motor 218 may be configured to convert energy source 220 into mechanical energy. Examples of energy sources 220 include gasoline, diesel, propane, other compressed gas-based fuels, ethanol, solar panels, batteries, and other sources of electrical power. Energy source(s) 220 may additionally or alternatively include any combination of fuel tanks, batteries, capacitors, and/or flywheels. In some embodiments, energy source 220 may provide energy for other systems of vehicle 200 as well.

Transmission 222 may be configured to transmit mechanical power from engine/motor 218 to wheels/tires 224. To this end, transmission 222 may include a gearbox, clutch, differential, drive shafts, and/or other elements. In embodiments where transmission 222 includes drive shafts, the drive shafts may include one or more axles that are configured to be coupled to wheels/tires 224.

Wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, wheels/tires 224 may be configured to rotate differentially with respect to other wheels/tires 224. In some embodiments, wheels/tires 224 may include at least one wheel that is fixedly attached to transmission 222 and at least one tire coupled to a rim of the wheel that could make contact with a driving surface. Wheels/tires 224 may include any combination of metal and rubber, or combination of other materials. Propulsion system 202 may additionally or alternatively include components other than those shown.

Sensor system 204 may include any number of sensors configured to sense information about vehicle 200 and/or an environment in which vehicle 200 is located, as well as one or more actuators 236 configured to modify a position and/or orientation of the sensors. As shown, sensor system 204 includes a Global Positioning System (GPS) 226, an inertial measurement unit (IMU) 228, a RADAR unit 230, a laser rangefinder and/or LIDAR unit 232, and a camera 234. Sensor system 204 may include additional sensors as well, including, for example, sensors that monitor internal systems of vehicle 200 (e.g., an $O_2$ monitor, a fuel gauge, an engine oil temperature, etc.). Other sensors are possible as well. In some examples, sensor system 204 may be implemented as multiple sensor units each mounted to the vehicle in a respective position (e.g., top side, bottom side, front side, back side, right side, left side, etc.).

GPS 226 may include any sensor (e.g., location sensor) configured to estimate a geographic location of vehicle 200. To this end, for example, GPS 226 may include a transceiver configured to estimate a position of vehicle 200 with respect to the Earth. IMU 228 may include any combination of direction sensors configured to sense position and orientation changes of the vehicle 200 based on inertial acceleration. Example IMU sensors include accelerometers, gyroscopes, other direction sensors, etc. RADAR unit 230 may include any sensor configured to sense objects in an environment in which vehicle 200 is located using radio signals. In some embodiments, in addition to sensing the objects, RADAR unit 230 may be configured to sense the speed and/or heading of the objects.

Laser rangefinder or LIDAR unit 232 may include any sensor configured to sense objects in the environment in which vehicle 200 is located using light. In particular, laser rangefinder or LIDAR unit 232 may include one or more light sources configured to emit one or more beams of light and a detector configured to detect reflections of the one or more beams of light. Laser rangefinder or LIDAR 232 may be configured to operate in a coherent (e.g., using heterodyne detection) or an incoherent detection mode. In some examples, LIDAR unit 232 may include multiple LIDARs, with each LIDAR having a particular position and/or configuration suitable for scanning a particular region of an environment around vehicle 200.

Camera 234 may include any camera (e.g., still camera, video camera, etc.) configured to capture images of the environment in which vehicle 200 is located. Sensor system 204 may additionally or alternatively include components other than those shown. Actuator(s) 236 may include any type of actuator configured to adjust a position, orientation, and/or pointing direction of one or more of the sensors in sensor system 204. Example actuators include motors, pneumatic actuators, hydraulic pistons, relays, solenoids, and piezoelectric actuators, among other examples.

Control system 206 may be configured to control operation of vehicle 200 and/or components thereof. To this end, control system 206 may include a steering unit 238, a throttle 240, a brake unit 242, a sensor fusion algorithm 244, a computer vision system 246, a navigation or pathing system 248, and an obstacle avoidance system 250.

Steering unit 238 may be any combination of mechanisms configured to adjust the heading of vehicle 200. Throttle 240 may be any combination of mechanisms configured to control the operating speed of engine/motor 218 and, in turn, the speed of vehicle 200. Brake unit 242 may be any combination of mechanisms configured to decelerate vehicle 200. For example, brake unit 242 may use friction to slow wheels/tires 224. In some examples, brake unit 242 may also convert kinetic energy of wheels/tires 224 to an electric current.

Sensor fusion algorithm 244 may be an algorithm (or a computer program product storing an algorithm) configured to accept data from sensor system 204 as an input. The data may include, for example, data representing information sensed at the sensors of sensor system 204. Sensor fusion algorithm 244 may include, for example, a Kalman filter, a Bayesian network, an algorithm for some of the functions of the methods herein, or any other algorithm. Sensor fusion algorithm 244 may further be configured to provide various assessments based on the data from sensor system 204, including, for example, evaluations of individual objects and/or features in the environment in which vehicle 100 is located, evaluations of particular situations, and/or evaluations of possible impacts based on particular situations.

Computer vision system 246 may be any system configured to process and analyze images captured by camera 234 in order to identify objects and/or features in the environment in which vehicle 200 is located, including, for example, traffic signals and obstacles. To this end, computer vision system 246 may use an object recognition algorithm, a Structure from Motion (SFM) algorithm, video tracking, or other computer vision techniques. In some embodiments, computer vision system 246 may additionally be configured to map the environment, track objects, estimate the speed of objects, etc.

Navigation and pathing system 248 may be any system configured to determine a driving path for vehicle 200. Navigation and pathing system 248 may additionally be configured to update the driving path dynamically while vehicle 200 is in operation. In some embodiments, navigation and pathing system 248 may be configured to incorporate data from sensor fusion algorithm 244, GPS 226, LIDAR unit 232, and one or more predetermined maps so as to determine the driving path for vehicle 200. Obstacle avoidance system 250 may be any system configured to identify, evaluate, and avoid or otherwise negotiate obstacles in the environment in which vehicle 200 is located. Control system 206 may additionally or alternatively include components other than those shown.

Peripherals 208 (e.g., input interface, output interface, etc.) may be configured to allow vehicle 200 to interact with external sensors, other vehicles, external computing devices, and/or a user. To this end, peripherals 208 may include, for example, a wireless communication system 252, a touchscreen 254, a microphone 256, and/or a speaker 258.

Wireless communication system 252 may be any system configured to wirelessly couple to one or more other vehicles, sensors, or other entities, either directly or via a communication network. To this end, wireless communication system 252 may include an antenna and a chipset for communicating with the other vehicles, sensors, servers, or other entities either directly or via a communication network. Chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. Wireless communication system 252 may take other forms as well.

Touchscreen 254 may be used by a user as an input interface to input commands to vehicle 200. To this end, touchscreen 254 may be configured to sense at least one of a position and a movement of a user's finger via capacitive sensing, resistance sensing, or a surface acoustic wave process, among other possibilities. Touchscreen 254 may be capable of sensing finger movement in a direction parallel or planar to the touchscreen surface, in a direction normal to the touchscreen surface, or both, and may also be capable of sensing a level of pressure applied to the touchscreen surface. Touchscreen 254 may be formed of one or more translucent or transparent insulating layers and one or more translucent or transparent conducting layers. Touchscreen 254 may take other forms as well.

Microphone 256 may be configured to receive audio (e.g., a voice command or other audio input) from a user of vehicle 200. Similarly, speakers 258 may be configured to output audio to the user of vehicle 200. Peripherals 208 may additionally or alternatively include components other than those shown.

Computer system 210 may be configured to transmit data to, receive data from, interact with, and/or control one or more of propulsion system 202, sensor system 204, control system 206, and peripherals 208. To this end, computer system 210 may be communicatively linked to one or more of propulsion system 202, sensor system 204, control system 206, and peripherals 208 by a system bus, network, and/or other connection mechanism (not shown).

In one example, computer system 210 may be configured to control operation of transmission 222 to improve fuel efficiency. As another example, computer system 210 may be configured to cause camera 234 to capture images of the environment. As yet another example, computer system 210 may be configured to store and execute instructions corresponding to sensor fusion algorithm 244. Other examples are possible as well.

As shown, computer system 210 includes processor 212 and data storage 214. Processor 212 may comprise one or more general-purpose processors and/or one or more special-purpose processors. To the extent processor 212 includes more than one processor, such processors could work separately or in combination. Data storage 214, in turn, may comprise one or more volatile and/or one or more non-volatile storage components, such as optical, magnetic, and/or organic storage among other possibilities, and data storage 214 may be integrated in whole or in part with processor 212.

In some embodiments, data storage 214 contains instructions 216 (e.g., program logic) executable by processor 212 to execute various vehicle functions. Data storage 214 may contain additional instructions as well, including instructions to transmit data to, receive data from, interact with, and/or control one or more of propulsion system 202, sensor system 204, control system 206, and/or peripherals 208. In some embodiments, data storage 214 also contains calibration data for one or more of the sensors in sensor system 204. For example, the calibration data may include a mapping between previously obtained sensor measurements and one or more predetermined inputs to the sensors. Computer system 210 may additionally or alternatively include components other than those shown.

Power supply 260 may be configured to provide power to some or all of the components of vehicle 200. To this end, power supply 260 may include, for example, a rechargeable lithium-ion or lead-acid battery. In some embodiments, one or more banks of batteries could be configured to provide electrical power. Other power supply materials and configurations are possible as well. In some embodiments, power supply 260 and energy source 220 may be implemented together as one component, as in some all-electric cars for instance.

In some embodiments, vehicle 200 may include one or more elements in addition to or instead of those shown. For example, vehicle 200 may include one or more additional interfaces and/or power supplies. Other additional components are possible as well. In such embodiments, data storage 214 may further include instructions executable by processor 212 to control and/or communicate with the additional components. Still further, while each of the components and systems are shown to be integrated in vehicle 200, in some embodiments, one or more components or systems can be removably mounted on or otherwise connected (mechanically or electrically) to vehicle 200 using wired or wireless connections.

III. Example Rotary Joint Configurations

Within examples, a rotary joint may be configured as a communication interface between two structures of an electromechanical system, in which one or both of the two structures is configured to rotate or otherwise move relative to the other structure. To that end, in some implementations herein, a portion of the rotary joint (e.g., rotor) may be coupled to one structure of the example system and another portion (e.g., stator) may be coupled to the other structure of the example system. Additionally or alternatively, in some example implementations, the rotary joint may be included within a structure arranged between two structures that rotate (or move) with respect to one another. For instance, in an example system that includes a robotic joint that couples two robotic links, the rotary joint may be disposed between the two robotic links. Other example implementations are possible as well.

Figure 3:
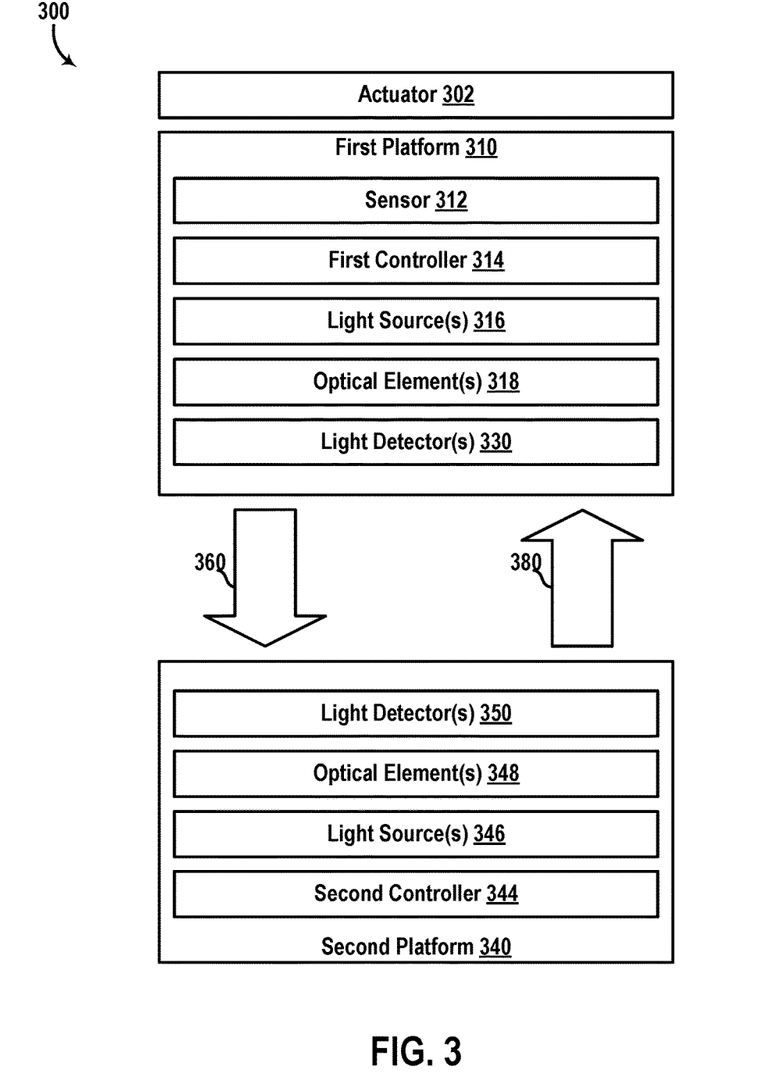
FIG. 3 is a simplified block diagram of a device that includes a rotary joint, according to an example embodiment.

FIG. 3 is a simplified block diagram of a device 300 that includes a rotary joint, according to an example embodiment. For example, device 300 can be used with an electromechanical system, such as any of vehicles 100 and 200, or any other electromechanical system. Thus, for instance, device 300 can be physically implemented as a rotary joint that facilitates communication between two moveable components of a system (or subsystem), such as a rotating platform mounts sensors such as any of the sensors included in sensor units 102, 104, 106, 108, 110, sensor system 204, among other possibilities. As shown, device 300 includes an actuator 302, a first platform 310 and a second platform 340.

Actuator 302 may be similar to the actuator(s) 236 of the vehicle 200. In some examples, actuator 302 may be configured to cause a relative rotation between first platform 310 (or one or more components thereof) and second platform 340 (or one or more components thereof). To that end, for example, the actuator 302 may be coupled to one or both of platforms 310, 340 (or one or more components thereof) to cause the relative rotation.

First platform 310 may comprise or may be coupled to a sensor mounting platform, and may be configured as a rotor or a stator in a rotary joint configuration. For example, actuator 302 may be configured to rotate platform 310 relative to platform 340 and about an axis of rotation of platform 310 (e.g., rotor axis, etc.). Alternatively or additionally, for example, actuator 302 could rotate platform 340 relative platform 310 about an axis of rotation of platform 340. Thus, within various examples, platform 310 can be configured as a rotating platform (e.g., rotor) or a stationary platform (e.g., stator) in a rotary joint configuration.

As shown, platform 310 includes a sensor 312, a first controller 314, one or more light sources 316, one or more optical elements 318, and one or more light detectors 330. In some examples, platform 310 may comprise any solid material suitable for supporting and/or mounting various components of platform 310. For instance, platform 310 may include a printed circuit board (PCB) that mounts light source(s) 316, light detector(s) 320, and/or other components of platform 310. The PCB in this instance can be positioned such that the mounted components are along a side of platform 310 facing or opposite to a corresponding side of platform 340. With this arrangement, for instance, light source(s) 316 can emit light 360 for propagation toward second platform 340 and light detector(s) 330 can receive light 380 propagating from second platform 340 toward first platform 310.

Sensor 312 may include any combination of sensors mounted to first platform 310, such as one or more sensors of sensor system 204, one or more of the sensors included in vehicle 100, and/or any other sensor that can be mounted on platform 310. A non-exhaustive list of example sensors may include direction sensors (e.g., gyroscopes), remote sensing sensors (e.g., RADARs, LIDARs, etc.), sound sensors (e.g., microphones), among others.

First controller 314 may be configured to operate one or more of the various components of first platform 310. To that end, controller 314 may include any combination of general-purpose processors, special-purpose-processors, data storage, logic circuitry, and/or any other circuitry configured to operate one or more components of device 300. In one implementation, similarly to computing system 210, controller 314 includes one or more processors (e.g., processor 212) that execute instructions (e.g., instructions 216) stored in data storage (e.g., data storage 214) to operate sensor 312 and/or light source(s) 316. In another implementation, controller 314 alternatively or additionally includes circuitry wired to perform one or more of the functions and processes described herein. For example, in any of these implementations, first controller 314 can be configured to receive sensor data collected by sensor 312 and to provide a modulated electrical signal indicative of the sensor data to light source(s) 316. For instance, the sensor data may indicate a measured direction or orientation of sensor 312, a scan of a surrounding environment by sensor 312, sounds detected by sensor 312, and/or any other sensor output of sensor 312.

Light source(s) 316 may include one or more light sources arranged to emit or otherwise provide light beam(s) 360 incident on second platform 340. To that end, light source(s) 316 may include laser diodes, light emitting diodes (LEDs), vertical cavity surface emitting lasers (VCSEL), organic light emitting diodes (OLEDs), polymer light emitting diodes (PLED), light emitting polymers (LEP), liquid crystal displays (LCD), microelectromechanical systems (MEMS), discharge light sources (e.g., fluorescent lamp, etc.), incandescent light sources (e.g., halogen lamp, filament lamp, etc.), combustion light sources, and/or any other light source configured to emit light 360 toward platform 340.

In a first implementation, light source(s) 316 comprise a plurality of light sources mounted in platform 310 in a substantially circular arrangement around an axis of rotation of the platform 310. The plurality of light sources may emit a plurality of light beams that diverge to form a ring-shaped light beam incident on platform 340 (and/or a component thereof). For example, platforms 310 and 340 can be positioned at a predetermined distance to one another. The predetermined distance can be selected according to the respective distances between adjacent light sources and/or beam divergences of the adjacent light sources. A beam divergence may be an angular measure of the increase in beam diameter or radius relative to a distance of propagation of light beam(s) 360. Thus, for instance, the predetermined distance can be selected to be greater than or equal to a distance at which adjacent light beams of light 360 intersect (after emission by respective light sources 316). In a second implementation, light source(s) 316 comprise a single ring-shaped light source. For instance, a single light source 316 can be implemented as an OLED patterned on a PCB surface in the shape of a ring, among other possibilities. In a third implementation, light source(s) 316 comprise one or more light sources coupled to one or more optical elements (e.g., light diffusers, lens, filters, etc.) that are arranged to redirect or focus light beam(s) 360 to form a ring-shaped light beam incident on platform 340.

Accordingly, in some examples, device 300 can optionally include one or more optical elements 318 (e.g., light diffuser, ring diffuser, etc.) optically coupled to light source(s) 316 to condition and/or focus light 304 to form a ring-shaped light beam.

Detector(s) 330 may comprise one or more light detectors or photodetectors that convert light 380 (propagating from platform 340 toward platform 310) into a signal (e.g., a voltage and/or current signal) that can be measured via first controller 314. To that end, light detector(s) or photodetector(s) 330 may include any combination of light sensors such as photodiodes, photoemission sensors, photoelectric sensors, photovoltaic sensors, thermal sensors, polarization sensors, and/or photochemical sensors, among others. In some examples, detector(s) 330 may be configured to detect light at a particular wavelength or within a particular bandwidth associated with light 380. Thus, for example, device 300 can be less sensitive to noise (e.g., environmental light signals) that is not within a predetermined wavelength range associated with light 380.

In some implementations, detector(s) 330 comprise a detector that remains at least partially overlapping light beam 380 in response to actuator 302 rotating platform 310 relative to platform 340. For example, light beam 380 may comprise light beam(s) having a ring shape or other continuous shape (e.g., a combination of adjacent light beams that intersect at or prior to arrival at platform 310, etc.) extending around an axis of rotation of platform 310. In this example, detector 330 can be positioned at a particular distance to the axis of rotation such that detector 330 overlaps (at least partially) light beam(s) 380 at any orientation of platform 310 about the axis of rotation. Thus, for example, where light beam 380 is a modulated light beam (e.g., sequence of light pulses, etc.) indicating wirelessly transmitted data from platform 340, detector 330 can continue to detect the modulated light beam even if platform 310 rotates relative to platform 340.

In some scenarios, where light 380 comprises a plurality of light beams from a plurality of light sources, the intensity of light 380 arriving at platform 310 may vary at different orientations or positions of platform 310 about an axis of rotation thereof. As a result, a signal-to-noise ratio of output from a single detector may vary depending on the orientation of the first platform 310 about the axis.

Accordingly, in some implementations, detector(s) 330 comprise a plurality of detectors that remain at least partially overlapping light beam 380 in response to actuator 302 rotating platform 310 relative to platform 340. For example, a first detector can be positioned at an offset separation distance to a second detector such that when the first detector detects a high intensity portion of light 380, the second detector detects a lower intensity portion of light 380, and vice versa. In these implementations, controller 314 can use a sum of output signals from the two detectors (e.g., the two detectors can be coupled in a parallel circuit configuration, or the output signals from the two detectors can be summed at controller 314, etc.) as a light detection signal that is less susceptible to noise fluctuations (e.g., improved signal-to-noise ratio, etc.) due to the orientation of first platform 310 about the axis of rotation.

Second platform 340 may be configured as a rotor platform or a stator platform, similarly to the various configurations discussed above for platform 310. As shown, platform 340 includes a second controller 344, one or more light sources 346, one or more optical elements 348, and one or more light detectors 350. In some examples, platform 340 may also include one or more orientation sensors (not shown), such as encoders, range sensors, etc., that provide a measure of the orientation of first platform 310 relative to second platform 340 (and about an axis of rotation of first platform 310).

Second controller 344 can have various physical implementations (e.g., processors, logic circuitry, data storage, etc.) similarly to first controller 314, for example. Further, controller 344 can operate light source(s) 346 to transmit a modulated light signal 380 indicating a transmission of data or instructions similarly to, respectively, controller 314, light source(s) 316, and light signal 360. For instance, second controller 344 can provide a modulated electrical signal to cause light source(s) 346 to provide modulated light 380 indicating instructions for operating sensor 312 and/or any other component (e.g., actuator 302, etc.) that may be coupled to platform 310. Further, for instance, controller 344 can receive a modulated electrical signal from detector(s) 350 in response to detection of modulated light 360. To that end, for instance, modulated light 360 may indicate sensor data collected by sensor 312 and transmitted, via light 360, to platform 340.

Thus, for example, light source(s) 346, optical element(s) 348, and light detector(s) 350 can be configured, physically implemented, and/or arranged, etc., in a similar manner to, respectively, light source(s) 316, optical element(s) 318, and light detector(s) 330. However, in some examples, one or more components of platform 340 can have different characteristics than corresponding components of platform 310. For example, light source(s) 346 can be physically implemented to include a different number of light sources or may emit light 380 having different wavelengths than wavelengths of light 360, among other possibilities (e.g., different phases, polarizations, intensities, etc.).

In some implementations, device 300 may include fewer components than those shown. For example, device 300 can be implemented without optical element(s) 318, optical element(s) 348, and/or any other component shown. In some implementations, device 300 may include one or more components in addition to or instead of those shown. For example, platforms 310 and/or 340 may include additional or alternative sensors (e.g., microphone 256, etc.), computing subsystems (e.g., navigation system 248, etc.), communication interfaces (e.g., wireless communication system 252, etc.), and/or any other component such as any of the components of vehicles 100 and 200. Thus, in some examples, device 300 can facilitate one way or two way communication between any number of devices (respectively distributed or coupled to platforms 310 and 340) via an optical communication path defined by light signals 360, 380. For instance, controllers 314 and 344 can operate the optical communication path as a shared data bus by scheduling/controlling data traffic between component(s) mounted (or coupled) to platform 310 and component(s) mounted (or coupled) to platform 340.

Accordingly, in some examples, device 300 can be configured to support a controller area network (CAN) data bus communication protocol for communication between subsystems or CAN nodes in a system such as vehicles 100 and 200. In one example arrangement, each of controllers 314 and 344 may include or may be coupled to a respective CAN transceiver that transmits (e.g., "CAN_TX") and/or monitors modulated electrical signals that are used to modulate, respectively, light beams 360 and 380. Further, the respective CAN transceivers can also receive (e.g., "CAN_RX") and/or monitor outputs detected, respectively, by detectors 330 and 350. By way of example, when data associated with a first CAN node (e.g., sensor 312) is being transmitted (e.g., by modulating light 350 using CAN_TX signal of platform 310) from platform 310, the CAN transceiver of platform 310 can simultaneously monitor its CAN_RX signal. If the monitored CAN_RX signal matches the CAN_TX signal, then controller 314 may continue transmitting the data from the first CAN node. Whereas, if there is a mismatch, then controller 314 may determine that a second CAN node associated with platform 340 has a higher priority or dominant state for using the CAN data bus, and may thus stop or delay transmitting additional data from the first CAN node until the transmission of the data from the second CAN node is completed.

Thus, with this arrangement, for instance, controllers 314, 344, and/or another computing system (e.g., computing system 210, etc.) can assign or determine transmission priorities for the various CAN nodes communicating over optical communication interface 360, 380. When a CAN node asserts a dominant state for communication over the CAN bus, controllers 314 and/or 344 can responsively delay, buffer, and/or otherwise re-schedule data from other CAN nodes until the dominant CAN node completes its transmission. By way of example, if transmission of data from sensor 312 is assigned a higher priority than data or sensor operation instructions from controller 344, then controller 314 may cause light source(s) 316 to modulate light 360 in a manner that indicates that data from sensor 312 has the dominant transmission state. For example, modulated light signal 360 may cause the CAN_RX signal of controller 344 to correspond to a logical low value. In response to detecting a low CAN_RX value, for instance, controller 344 may be configured to stop or delay transmission of data using light 380 until transmission of the data associated with sensor 312 is completed, or until data associated with another CAN node coupled to controller 344 and having a higher priority than the CAN node of sensor 312 becomes available. If higher priority data is available for transmission, then controller 344 can operate light source(s) 346 to modulate light 380 according to a modulation indicating an assertion of the dominant state for data transmission by controller 344 instead of the data transmission by controller 314, for example.

The assignment of transmission priorities to data associated with various CAN nodes can be based on various factors depending on the design and application of the system that includes device 300. In one example, where sensor 312 is a direction sensor (e.g., gyroscope), the system can assign a high priority to data from sensor 312 when the sensor detects at least a threshold amount of change to the measured direction, and a lower priority when the sensor detects less than the threshold amount of change (e.g., fluctuations). The threshold can be any value depending on design considerations and/or output characteristics of sensor 312 among other factors. Additionally, other CAN transmission priority assignment schemes are possible as well. Additionally, other CAN protocol implementations are possible as well. Thus, within examples, device 300 provides an optical rotary joint CAN bus communication interface.

Figure 4A:
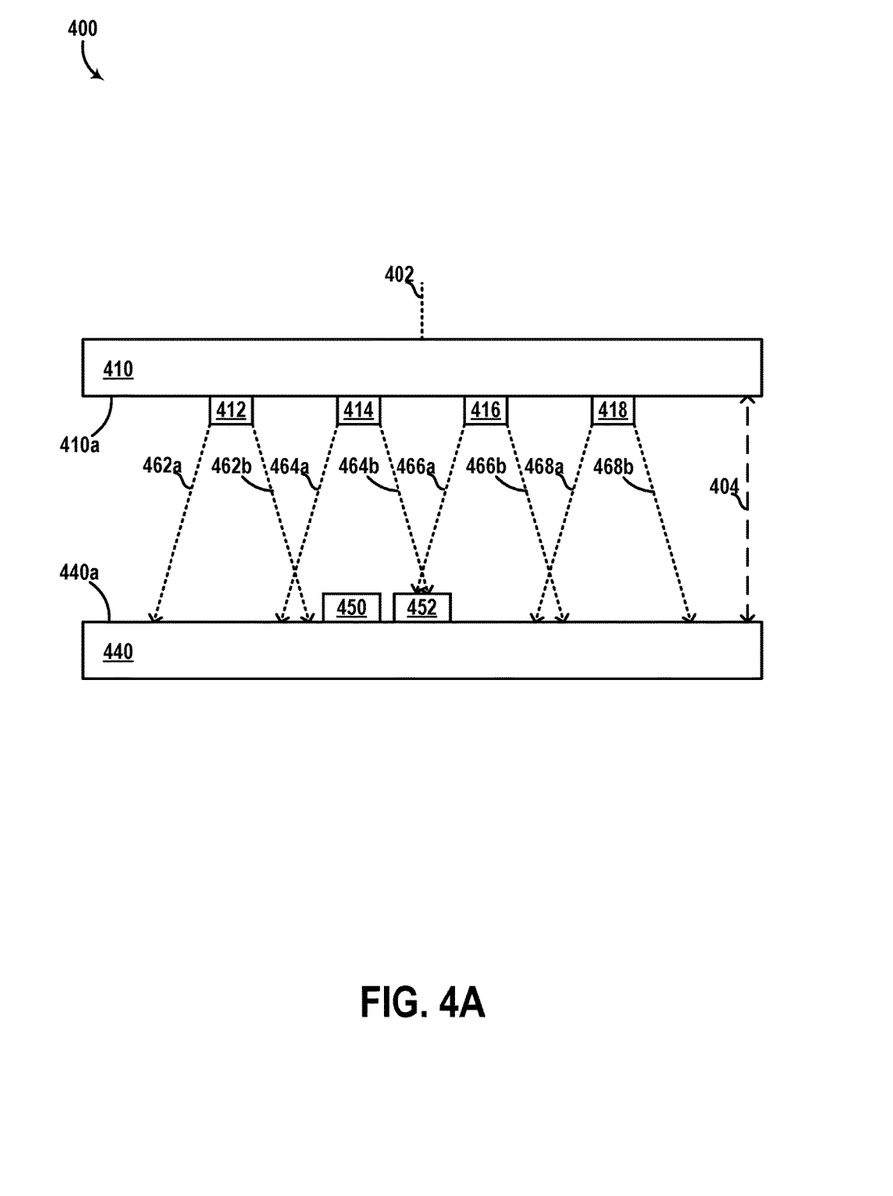
FIG. 4A illustrates a side view of a device that includes a rotary joint, according to an example embodiment.

FIG. 4A illustrates a side view of a device 400 that includes a rotary joint, according to an example embodiment. For example, device 400 may be similar to device 300, and can be used with an electromechanical system such as vehicles 100 and 200. As shown, device 400 includes platforms 410 and 440 that may be similar, respectively, to platforms 310 and 340. Further, as shown, device 400 also includes a plurality of light sources 412, 414, 416, 418 that may be similar to light source(s) 316. Further, as shown, device 400 includes light detectors 450 and 452 that may be similar to detector(s) 350. In the example shown, a side 410a of platform 410 is positioned at a predetermined distance 404 to a side 440a of platform 440.

It is noted that some components of device 400 are omitted from the illustration of FIG. 4A for convenience in description. For example, FIGS. 4B and 4C illustrate cross-section views of device 400.

Figure 4B:
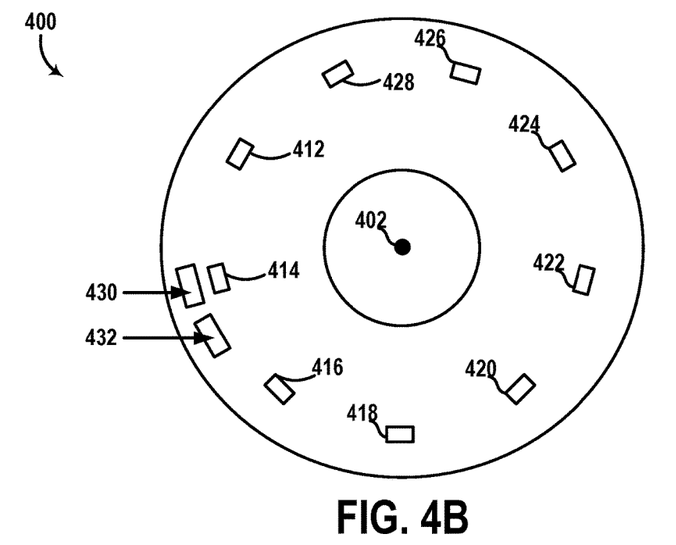
FIG. 4B illustrates a cross-section view of the device shown in FIG. 4A.

In the cross section view shown in FIG. 4B, side 410a of platform 410 is pointing out of the page. As shown in FIG.

4B, device 400 also includes detectors 430, 432 that may be similar to detector(s) 330, for example. Further, as shown, device 400 also includes light sources 420, 422, 424, 426, 428 that are arranged (along with light sources 412-418) in a substantially circular arrangement around axis of rotation 402 of platform 410.

Figure 4C:
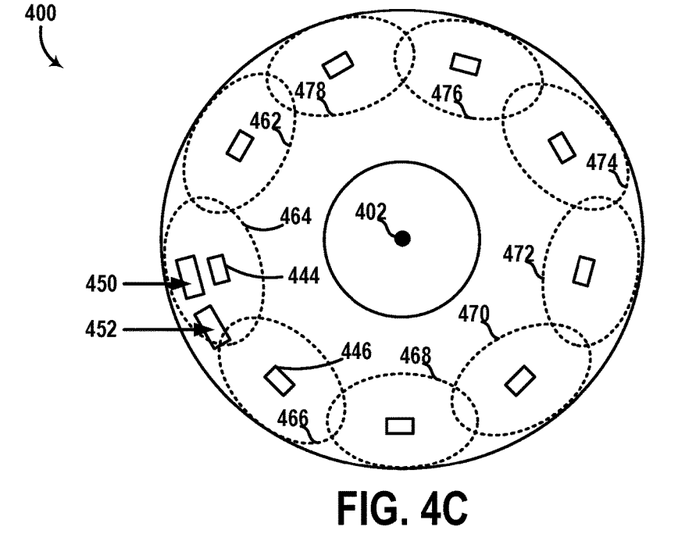
FIG. 4C illustrates another cross-section view of the device shown in FIG. 4A.

In the cross section view shown in FIG. 4C, side 440a of platform 440 is pointing out of the page. As shown in FIG. 4C, device 400 may also include a plurality of light sources, exemplified by light sources 444 and 446, which are also arranged in a circular arrangement around axis of rotation 402. Thus, in some examples, similarly to device 300, device 400 can be configured for two-way communication between platforms 410 and 440. For instance, light sources 412-428 of platform 410 can be configured to emit light propagating toward detectors 450 and/or 452 of platform 440. Similarly, for instance, light sources of platform 440 (e.g., light sources 444, 446, etc.) can be configured to emit light propagating toward detectors 430 and/or 432 of platform 410.

Referring back to FIG. 4A, light sources 412, 414, 416, 418 may respectively emit a plurality of light beams 462 (extending between arrows 462a and 462b), 464 (extending between arrows 464a and 464b), 466 (extending between arrows 466a and 466b), and 468 (extending between arrows 468a and 468b). Further, as shown, adjacent light beams may intersect at or prior to arrival of the respective light beams at side 440a (and/or detectors 450, 452) of platform 440 to form a combined (e.g., continuous, etc.) light beam. As shown in FIG. 4B, for instance, light sources 420, 422, 424, 426, 428 can also emit light beams that intersect with respective adjacent light beams, similarly to light beams 462-468 emitted by light sources 412-418. As shown in FIG. 4C, for instance, light beams 470, 472, 474, 476, 478 that arrive at platform 440 may correspond, respectively, to light beams emitted by light sources 420, 422, 424, 426, 428. Together, for instance, light beams 462-478 may combine prior to propagation for predetermined distance 404 from platform 410 to form a continuous ring-shaped light beam extending around axis of rotation 402 as shown in FIG. 4C.

Thus, in line with the discussion above, detectors 450 and/or 452 may continue to receive the combined light beam as platforms 410 and/or 440 rotate with respect to one another (e.g., about axis of rotation 402). By way of example, platform 410 and/or 440 can be rotated such that first side 410a and second side 440a remain within predetermined distance 404 to one another. For instance, platform 410 could be rotated about the shared (e.g., center) axis 402, thereby substantially remaining at least at predetermined distance 404 to platform 440. To that end, distance 404 could be any distance suitable for communication between one or more of light sources 412-428 and one or more of detectors 450, 452.

For instance, as shown in FIG. 4A, distance 404 can be selected to be greater than a distance at which adjacent light beams of light beams 462, 464, 466, 468 intersect. Alternatively, in another implementation (not shown), distance 404 can be selected to be equal to the distance at which the adjacent light beams intersect. With either arrangement, the intersecting light beams can form a continuous or combined light beam incident on side 440a such that detector 450 (and/or 452) can remain overlapping the incident combined light beam as platform 410 rotates about axis 402.

The distance at which adjacent light beams intersect, for instance, may depend on respective beam divergences of the adjacent light beams. The beam divergence of light beam 462, for instance, may correspond to the angle between arrows 462a and 462b and may be based on physical characteristics or a configuration of light source 412. For example, if the beam divergence of light beam 462 increases, then the distance (from side 410a) at which arrow 462b intersects with arrow 464a may decrease, and vice versa. Additionally or alternatively, for instance, the distance at which the adjacent light beams intersect may depend on a separation distance between adjacent light sources. For instance, if the separation distance between light sources 412 and 414 increases, then the distance (from side 410a) at which arrows 462b and 464a intersect may also increase. Accordingly, predetermined distance 404 can be based on an arrangement (e.g., separation distances) and/or beam divergence characteristics of light sources 412-428. Thus, in some examples, distance 404 can be adjusted by using fewer, more, or different light sources (e.g., having different beam divergences) than those shown, in accordance with various applications (e.g., size requirements, etc.) of device 400.

Additionally or alternatively, in some examples, detectors 450 and/or 452 could be configured to remain overlapping the combined light beam in response to a different type of relative motion (e.g., other than a rotation) between platforms 410 and 440 even if the motion causes a change to distance 404. By way of example, an actuator (not shown) of device 400 could be configured to adjust the position of platform 410 along a translational path (e.g., along axis 402, along another linear axis, etc.), or other path (e.g., elliptical path, curved path, etc.). For instance, device 400 may be included in a computer numeric control (CNC) machine or a 3D printer that operates a tool (e.g., drill, saw, printer head, etc.) via a robotic arm or other hardware component. In this instance, platform 410 may be coupled to the tool, and platform 440 may be coupled to a controller (and/or an actuator) that adjusts the position of platform 410 linearly along axis 402. In this instance, device 400 may be configured to restrict linear motion of platform 410 along axis 402 such that distance 404 remains sufficiently large for beams 462-468 to intersect prior to arrival of beams 462-468 at second side 440a (or detectors 450/462). Thus, for example, detectors 450 and/or 452 may continue to receive the combined light beam as platforms 410 and/or 440 are linearly (or otherwise) displaced with respect to one another.

Although sides 410a and 440a are shown to be substantially parallel and overlapping, in some examples, device 400 can be alternatively arranged such that platforms 410 and 440 are not substantially parallel and/or overlapping. By way of example, platform 410 can be alternatively arranged at a different angle (e.g., tilted, etc.) relative to platform 440, and device 400 may include a mirror (e.g., optical element 318, etc.) that reflects light beams 462-468 (prior to or after intersection of the light beams) toward side 440a of platform 440 (and/or toward detectors 450/452). In one example implementation, platform 410 may be included in a robotic link (not shown) configured to move along or around multiple axes of motion (not shown), and platform 440 may be included in a robotic joint coupled to the robotic link. In this implementation, device 400 may include one or more optical elements (e.g., mirrors) arranged such that light beams 462-468 are reflected or otherwise directed toward side 440a (or detectors 450, 452) in response to a motion of the robotic link according to any of the axes of motion. Thus, in this implementation, detectors 450 and/or 452 could remain overlapping the combined light beam 462-468 in response to various motions of the platform 410 relative to platform 440.

As noted above, in some scenarios, an output signal from detector 450 and/or 452 may vary as platform 410 rotates about axis 402. Referring back to FIG. 4A by way of example, consider a scenario where platform 410 rotates about axis 402 in a clockwise direction. In the scenario, detector 450 could be implemented as a photodiode (or other photodetector) that outputs an electrical current having an amplitude that varies based on the intensity of detected light (e.g., light beam 464). As platform 410 rotates, light beam 464 emitted by light source 414 may away from detector 450 (e.g., toward left side of the page), and thus the intensity of light beam 464 may also become reduced. Additionally, after a sufficient amount of rotation detector 452 may overlap a region where light beams 464 and 466 (emitted by source 416) intersect, such as the region shown to overlap detector 452. In this scenario, the light intensity detected by detector 450 may thus increase due to detecting light from both sources 414 and 416.

Thus, to mitigate the noise effect of such variations, as noted above for device 300, device 400 could sum the output signals of detectors 450 and 452 to generate a less angle dependent output signal (e.g., an output signal that is less dependent on the position of platform 410 relative to platform 440). Continuing with the scenario above by way of example, when detector 450 overlaps the high light intensity area that previously overlapped detector 452, detector 452 will then overlap a low light intensity area of light beam 466 (e.g., where light beam 466 does not intersect with light beams 464 and/or 468). Thus, with this arrangement, a sum of signals from detectors 450 and 452 may remain relatively more stable than a signal from only one of the two detectors.

To facilitate this, in some implementations, detectors 450 and 452 can be arranged along a circular path that is concentric with the circular arrangement of light sources 412-428. For example, as shown in FIG. 4C, detectors 450 and 452 are both at a substantially similar given distance to axis of rotation 402. Although FIG. 4C shows detectors 450 and 452 positioned at the given distance to axis 402 that is greater than a distance between light sources 412-428 and axis 402, in some implementations, detectors 450 and 452 can be alternatively arranged at the same distance as the circular arrangement of light sources 412-428 (e.g., between light sources 444 and 446, etc.), or at a lesser distance to axis 402.

Further, in some implementations, a separation distance between detectors 450 and 452 can be selected to be less than a separation distance between adjacent light sources of platform 410. For instance, as shown in FIG. 4A, the separation distance between detectors 450 and 452 is less than the separation distance between light sources 414 and 416. Thus, for instance, when detector 450 overlaps a region where light beams 464 and 466 do not intersect, detector 452 simultaneously overlaps a region where both light beams intersect. Conversely, for instance, when detector 450 overlaps the intersecting light beam region, then detector 452 may overlap a non-intersecting region (e.g., of light beam 466).

It is noted that device 400 may include fewer or more components than those shown, such as any of the components of device 300 (e.g., actuators, sensors, controllers, etc.), among other possibilities. In one example, although device 400 is shown to include nine light sources mounted on each platform, device 400 can alternatively include more or fewer light sources. In another example, light sources 412-418 can be replaced with a single ring-shaped light source extending around axis 402 to provide a continuous (ring-shaped) light beam around axis 402. In yet another example, one or more light sources can be optically coupled to a light diffuser that redirects and/or focuses light from the light source(s) to form a ring-shaped light beam incident on platform 440.

It is also noted that the shapes, dimensions, and relative positions shown in FIGS. 4A-4C for device 400 and/or the various components thereof are not necessarily to scale and are only illustrated as shown for convenience in description. Thus, in some implementations, device 400 and/or one or more components thereof can have other forms, shapes, arrangements, and/or dimensions as well.

IV. Example Methods and Computer-Readable Media

Figure 5:
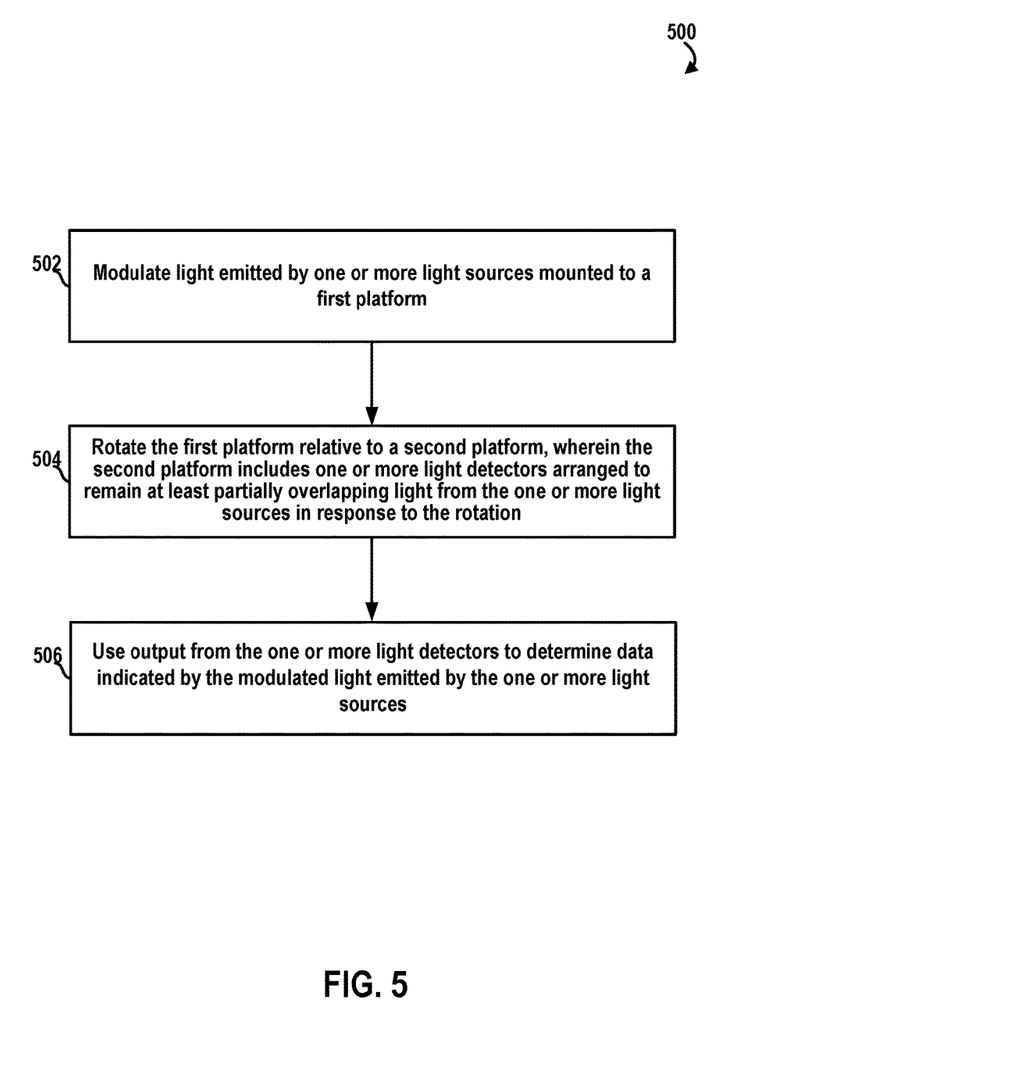
FIG. 5 is a flowchart of a method, according to an example embodiment.

FIG. 5 is a flowchart of a method 500, according to an example embodiment. Method 500 shown in FIG. 5 presents an embodiment of a method that could be used with any of the vehicles 100, 200, and/or the devices 300, 400, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 500 and other processes and methods disclosed herein, each block in FIG. 5 may represent circuitry that is wired to perform the specific logical functions in the process.

At block 502, method 500 involves modulating light emitted by one or more light sources mounted to a first platform. For example, controller 314 can receive sensor data collected by sensor 312, and provide a modulated electrical signal to cause light source(s) 316 to emit modulated light, such as a sequence of light pulses or a light intensity modulated light signal. The modulated light, for example, may be indicative of the sensor data collected by sensor 312.

At block 504, method 500 involves rotating the first platform relative to the second platform. The second platform may include one or more light detectors arranged to remain at least partially overlapping light from the one or more light sources in response to the rotation. For example, device 400 can rotate platform 410 about a common axis extending through centers of platforms 410 and 440. As a result, for instance, platforms 410 and 440 may remain at least at predetermined distance 404 to one another. Further, detector 450 and/or 452 can be arranged along a circular path as shown in FIG. 4C such that the detector(s) 450, 452 remain at least partially overlapping one or more of light beams 462-478 emitted respectively by light sources 412-428.

At block 506, method 500 involves using output from the one or more light detectors to determine data indicated by the modulated light emitted by the one or more light sources. In some examples, device 400 can sum the signals from detectors 450, 452 and use the combined signal as a basis to determine the modulated electrical signal transmitted via light beams 462-478. Device 400 can then use the modulated electrical signal as a basis to determine data transmitted from platform 410 to platform 440.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
    a first platform that includes a first mounting surface;
    a second platform that includes a second mounting surface positioned within a predetermined distance to the first mounting surface;
    an actuator that rotates the first platform relative to the second platform about an axis of rotation of the first platform, wherein the first mounting surface remains within the predetermined distance to the second mounting surface in response to the actuator rotating the first platform;
    a plurality of light sources mounted on the first mounting surface in a circular arrangement around the axis of rotation, wherein the plurality of light sources emit a plurality of light beams that diverge to form a ring-shaped light beam incident on the second mounting surface;
    a light detector mounted on the second mounting surface such that the light detector remains at least partially overlapping the ring-shaped light beam in response to the actuator rotating the first platform;
    a sensor coupled to the first platform such that the sensor rotates in response to the actuator rotating the first platform;
    a first controller electrically coupled to the sensor and the plurality of light sources, wherein the first controller: (i) receives data from the sensor, (ii) modulates a modulated electrical signal based on the received data, and (iii) causes transmission of the modulated electrical signal for receipt by the plurality of light sources, wherein the plurality of light sources modulate the ring-shaped light beam based on the modulated electrical signal; and
    a second controller electrically coupled to the light detector, wherein the second controller: (i) receives an indication of the modulated ring-shaped light beam from the light detector and (ii) determines the data from the sensor based on at least the received indication.

2. The device of claim 1, wherein the light detector is a first light detector, the device further comprising:
    a second light detector mounted on the second mounting surface such that the second light detector remains at least partially overlapping the ring-shaped light beam in response to the actuator rotating the first platform.

3. The device of claim 2, wherein the first light detector is at a given distance to the axis of rotation, and wherein the second light detector is at the given distance to the axis of rotation.

4. The device of claim 3, wherein the given distance is greater than a distance between the axis of rotation and the plurality of light sources.

5. The device of claim 2, wherein the first light detector is at a first separation distance to the second light detector, and wherein the first separation distance is less than a second separation distance between two adjacent light sources of the plurality of light sources.

6. The device of claim 2,
    wherein the second controller is electrically coupled to the first light detector and the second light detector,
    wherein the second controller determines an indication of the modulated electrical signal based on a sum of outputs of the first light detector and the second light detector.

7. The device of claim 6,
    wherein the first controller determines a first transmission priority for the sensor data,
    wherein the second controller generates instructions for transmission to the first controller, wherein the second controller determines a second transmission priority for the instructions,
    wherein the first controller provides the modulated electrical signal to the plurality of light sources in response to the first transmission priority being higher than the second transmission priority, and wherein the first controller delays provision of the modulated electrical signal to the plurality of light sources in response to the first transmission priority being lower than the second transmission priority.

8. A device comprising:
    a first platform having a first side;
    a second platform having a second side positioned to overlap the first side of the first platform;
    an actuator that rotates the first platform relative to the second platform and about an axis of rotation of the first platform;
    a plurality of light sources mounted to the first platform in a substantially circular arrangement around the axis of rotation of the first platform,
    wherein the plurality of light sources emit a plurality of diverging light beams such that respective adjacent light beams intersect at least at a predetermined distance to the first side, and
    wherein the first side remains at least at the predetermined distance to the second side in response to the actuator rotating the first platform;
    a light detector mounted to the second platform and positioned to at least partially overlap at least one of the plurality of light beams;

a sensor coupled to the first platform such that the sensor rotates in response to the actuator rotating the first platform;

a first controller electrically coupled to the sensor and the plurality of light sources, wherein the first controller: (i) receives data from the sensor, (ii) modulates a modulated electrical signal based on the received data, and (iii) causes transmission of the modulated electrical signal for receipt by the plurality of light sources, wherein the plurality of light sources respectively emit modulated light based on the modulated electrical signal; and a second controller electrically coupled to the light detector, wherein the second controller: (i) receives an indication of the modulated light from the light detector and (ii) determines the data from the sensor based on the received indication.

9. The device of claim 8, wherein the predetermined distance is based on (i) respective beam divergences of the plurality of light beams and (ii) the substantially circular arrangement of the plurality of light sources.

10. The device of claim 8, wherein the plurality of light sources comprise light emitting diodes (LEDs).

11. The device of claim 8, wherein the plurality of light sources are mounted on a first printed circuit board (PCB) included in the first platform, and wherein the light detector is mounted on a second PCB included in the second platform.

12. The device of claim 8, wherein the light detector is a first light detector, the device further comprising:

a second light detector included in the second platform and positioned to at least partially overlap one or more of the plurality of light beams.

13. The device of claim 12, wherein the first light detector is electrically coupled to the second light detector in a parallel circuit configuration to provide a sum of electrical currents flowing through the first light detector and the second light detector.

14. The device of claim 8, wherein the first controller generates the modulated electrical signal according to a controller access network (CAN) bus protocol.

15. A device comprising:

a first platform;

a second platform positioned to overlap the first platform;

an actuator that rotates the first platform relative to the second platform and about an axis of rotation of the first platform, wherein the first platform remains at a predetermined distance to the second platform in response to the actuator rotating the first platform;

at least one light source mounted to the first platform, wherein the at least one light source provides a ring-shaped light beam incident on the second platform;

a light detector mounted to the second platform and positioned to remain at least partially overlapping the ring-shaped light beam in response to the actuator rotating the first platform a sensor coupled to the first platform such that the sensor rotates in response to the actuator rotating the first platform;

a first controller electrically coupled to the sensor and the at least one light source, wherein the first controller: (i) receives data from the sensor, (ii) modulates a modulated electrical signal based on the received data, and (iii) causes transmission of the modulated electrical signal for receipt by the at least one light source, wherein the at least one light source modulates the ring-shaped light beam based on the modulated electrical signal; and a second controller electrically coupled to the light detector, wherein the second controller: (i) receives an indication of the modulated ring-shaped light beam from the light detector and (ii) determines the data from the sensor based on the received indication.

16. The device of claim 15, wherein the at least one light source is a single ring-shaped light source that emits the ring-shaped light beam.

17. The device of claim 15, the device further comprising:

a light diffuser optically coupled to the at least one light source, wherein the light diffuser conditions light emitted by the at least one light source to form the ring-shaped light beam.

18. The device of claim 17, wherein the at least one light source comprises a plurality of light sources optically coupled to the light diffuser.

19. The device of claim 15, wherein the at least one light source comprises a plurality of light sources in a substantially circular arrangement, wherein the plurality of light sources emit a plurality of diverging light beams toward the second platform, and wherein adjacent light beams of the plurality intersect to form the ring-shaped light beam.

* * * * *